US011688288B2

(12) United States Patent
Tillotson et al.

(10) Patent No.: US 11,688,288 B2
(45) Date of Patent: *Jun. 27, 2023

(54) COMMUNITY NOISE ABATEMENT IN DYNAMIC ENVIRONMENT

(71) Applicant: The Boeing Company, Chicago, IL (US)

(72) Inventors: Brian Tillotson, Kent, WA (US); Charles B. Spinelli, Phoenix, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,744

(22) Filed: May 27, 2022

(65) Prior Publication Data

US 2022/0292989 A1    Sep. 15, 2022

Related U.S. Application Data

(63) Continuation of application No. 16/535,147, filed on Aug. 8, 2019, now Pat. No. 11,373,540.

(51) Int. Cl.
  *G08G 5/00* (2006.01)
  *G01H 17/00* (2006.01)
  *G01C 21/20* (2006.01)

(52) U.S. Cl.
  CPC ............ *G08G 5/006* (2013.01); *G01C 21/20* (2013.01); *G01H 17/00* (2013.01); *G08G 5/0013* (2013.01); *G08G 5/0034* (2013.01)

(58) Field of Classification Search
  CPC .... G08G 5/006; G08G 5/0013; G08G 5/0034; G01C 21/20; G01H 17/00

(Continued)

(56) References Cited

U.S. PATENT DOCUMENTS 8,036,821 B2 *  10/2011  Cornett .............. G01C 21/3484
                                              701/415
8,798,922 B2    8/2014   Tillotson et al.
(Continued)

OTHER PUBLICATIONS

S. A. Salleh, Z. A. Latif, W. M. N. W. Mohd and A. Chan, "Air quality parameters dependency of remotely-sensed albedo," 2012 IEEE 8th International Colloquium on Signal Processing and its Applications, 2012, pp. 373-377, doi: 10.1109/CSPA.2012.6194752. (Year: 2012).

(Continued)

*Primary Examiner* — Isaac G Smith
(74) *Attorney, Agent, or Firm* — McDonnell Boehnen Hulbert & Berghoff LLP

(57) ABSTRACT

An example method includes determining, by a flight planning system, a perceived noise at a surface location based on acoustic noise emitted by an aerial vehicle at an aerial location. The aerial location corresponds to a waypoint along a proposed trajectory. Further, determining the perceived noise includes estimating propagation of the acoustic noise from the aerial location to the surface location based on environmental features of the environment or weather data. The flight planning method also includes determining, by the flight planning system using a noise-abatement function, a noise-abatement value of the proposed trajectory for the aerial vehicle based on the perceived noise at the surface location. In addition, the flight planning method includes determining, by the flight planning system, a flight plan for the aerial vehicle based on the noise-abatement value of the proposed trajectory, and outputting the flight plan for use in navigating the aerial vehicle.

20 Claims, 8 Drawing Sheets

(58) Field of Classification Search
USPC .......................................................... 701/492
See application file for complete search history.

(56) References Cited

U.S. PATENT DOCUMENTS

| | | | |
|---|---|---|---|
| 8,868,345 | B2 | 10/2014 | Lax et al. |
| 2018/0286372 | A1 | 10/2018 | Beckman et al. |
| 2020/0105149 | A1 | 4/2020 | Mahkonen et al. |
| 2021/0012669 | A1* | 1/2021 | Beaurepaire ........... G08G 5/006 |
| 2021/0043092 | A1 | 2/2021 | Tillotson et al. |

OTHER PUBLICATIONS

R. Niclos, J. A. Valiente, M. J. Barbera and V. Caselles, "Land Surface Air Temperature Retrieval From EOS-MODIS Images," in IEEE Geoscience and Remote Sensing Letters, vol. 11, No. 8, pp. 1380-1384, Aug. 2014, doi: 10.1109/LGRS.2013.2293540. (Year: 2014).
Non-Final Office Action for U.S. Appl. No. 16/535,147 dated May 13, 2021.
Final Office Action for U.S. Appl. No. 16/535,147 dated Oct. 28, 2021.

\* cited by examiner

COMMUNITY NOISE ABATEMENT IN DYNAMIC ENVIRONMENT

CROSS-REFERENCE TO RELATED APPLICATIONS

The present application is a continuation of U.S. patent application Ser. No. 16/535,147, filed Aug. 8, 2019, the entire contents of which are hereby incorporated by reference.

FIELD

The present disclosure relates generally to flight planning for aerial vehicles, and more particularly, to systems and methods for flight planning in a manner that reduces community noise due to aerial vehicles for a defined area.

BACKGROUND

The number of aerial vehicles, such as small unmanned aircraft, is proliferating. In addition, these aerial vehicles are more frequently operating close to urban areas and other noise-sensitive communities. In some instances, acoustic noise emitted by these aerial vehicles may be an annoyance to people, wildlife, or other animals on the ground.

Several solutions to reducing community noise from aerial vehicles exist. One solution is to design aerial vehicles that emit less acoustic noise. This solution can raise manufacturing costs and reduce performance. Other solutions include restricting operating hours for aerial vehicles, or prohibiting flight altogether in certain locations. These solutions, however, can unnecessarily limit the use of aerial vehicles for providing services at certain times and/or in certain locations. Improvements are therefore desired.

SUMMARY

In one example, a flight planning system for noise abatement is described. The flight planning system includes a geographical information system, an acoustic model system, a flight plan processing system, and an output system. The geographical information system is configured to store environmental features of an environment. The acoustic model system is configured to estimate perceived noise at a surface location based on acoustic noise emitted by an aerial vehicle at an aerial location. The acoustic model is configured to estimate the perceived noise based on the environmental features of the environment. The flight plan processing system is configured to: determine, using a noise-abatement function, a noise-abatement value of a proposed trajectory for the aerial vehicle based at least on the perceived noise at the surface location, and determine a flight plan for the aerial vehicle based on the noise-abatement value of the proposed trajectory. The output system is configured to output the flight plan for use in navigating the aerial vehicle.

In another example, a flight planning system for noise abatement is described. The flight planning system includes a weather model system, an acoustic model system, a flight plan processing system, and an output system. The weather model is configured to obtain weather data for an environment. The acoustic model system is configured to estimate perceived noise at a surface location based on acoustic noise emitted by an aerial vehicle at an aerial location. The acoustic model system is configured to estimate the perceived nose based on the weather data for the environment. The flight plan processing system is configured to: determine, using a noise-abatement value function, a noise-abatement value of a proposed trajectory for the aerial vehicle based at least on the perceived noise at the surface location, and determine a flight plan for the aerial vehicle based on the noise-abatement value of the proposed trajectory. The output system is configured to output the flight plan for use in navigating the aerial vehicle.

In another example, a flight planning method for noise abatement is described. The flight planning method includes determining, by a flight planning system, a perceived noise at a surface location based on acoustic noise emitted by an aerial vehicle at an aerial location. The aerial location corresponds to a waypoint along a proposed trajectory. Determining the perceived noise includes estimating propagation of the acoustic noise from the aerial location to the surface location based on environmental features of the environment or weather data for the environment. The flight planning method also includes determining, by the flight planning system using a noise-abatement function, a noise-abatement value of the proposed trajectory for the aerial vehicle based on the perceived noise at the surface location. In addition, the flight planning method includes determining, by the flight planning system, a flight plan for the aerial vehicle based on the noise-abatement value of the proposed trajectory. Further, the flight planning method includes outputting, by the flight planning system, the flight plan for use in navigating the aerial vehicle.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
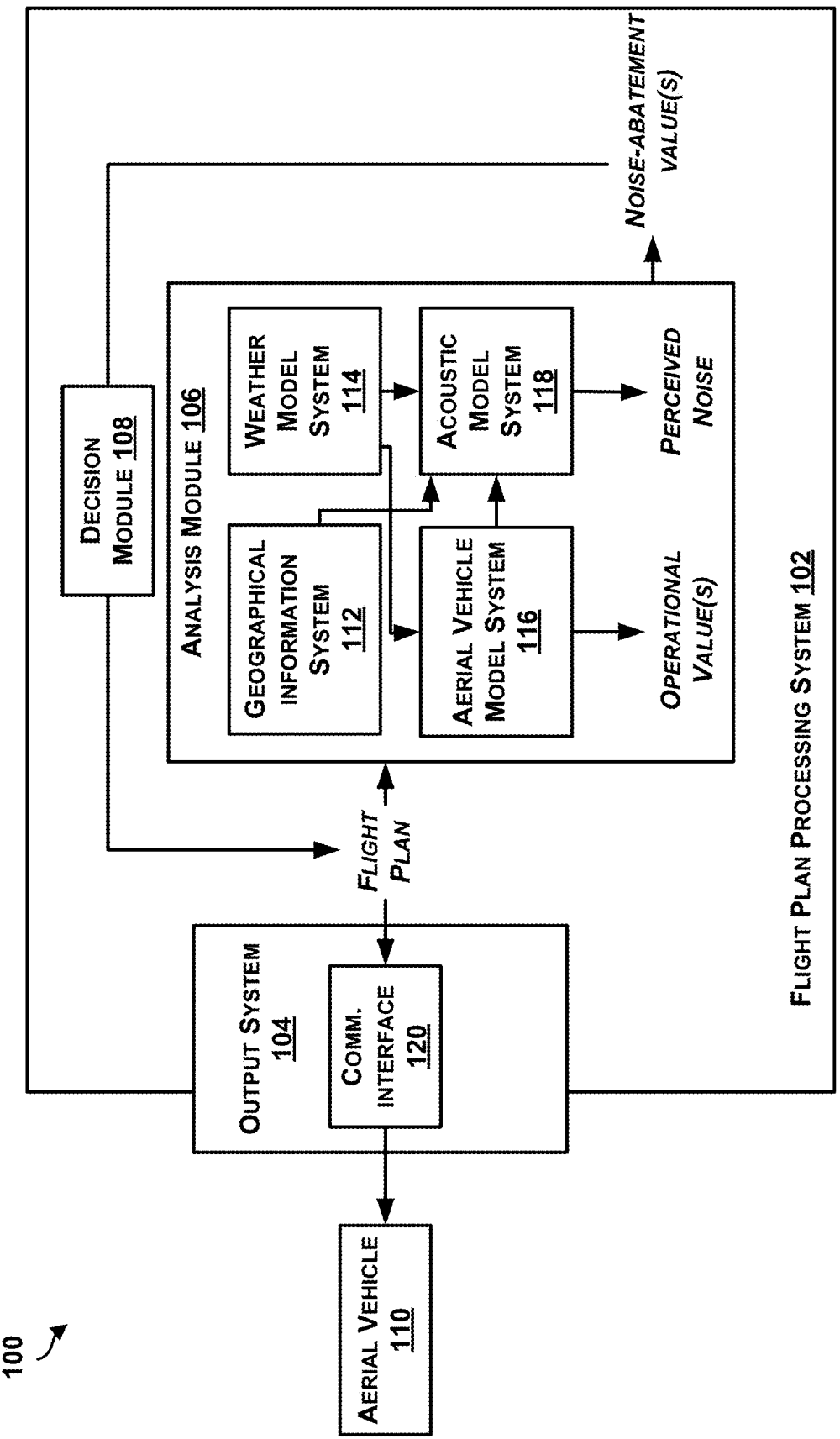
FIG. 1 illustrates a flight planning system, according to an example.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are systems and methods for flight planning that reduce community noise due to aerial vehicles for a defined area. The systems and methods use dynamic information about an environment, such as community activity, environmental features, and/or weather data, to select trajectories that cause acoustic noise emitted by aerial vehicles to be refracted away from a community, to be attenuated before reaching the community, or to be masked by other noises. As used herein, a community can include people, wildlife, and/or other animals. Dynamic information about an environment, such as current temperature gradients, wind shear, a level of foliage, or an amount of snowfall each affect sound propagation and, consequently, perceived community noise due to aerial vehicles. However, these types of dynamic information are generally not considered in existing solutions. By analyzing and factoring these types of dynamic information, the systems and methods described herein provide a unique solution to the problem of reducing perceived community noise due to aerial vehicles.

An example flight planning method involves determining a perceived noise at a surface location based on acoustic noise emitted by an aerial vehicle at an aerial location. The aerial location corresponds to a waypoint along a proposed trajectory. In addition, determining the perceived noise includes estimating the propagation of acoustic noise from the aerial location to the surface location based on environmental features of the environment or weather data for the environment. For instance, an aerial vehicle model system can estimate an acoustic intensity of the aerial vehicle as a function of inputs such as speed, configuration, and engine power. The estimate of acoustic intensity is an estimate of the power carried by sound waves emitted from the aerial vehicle, and can be expressed in units of watt per square meter. The aerial vehicle model system can then provide the acoustic intensity to an acoustic model system. The acoustic model system, in turn, can estimate the perceived noise at the surface location based on the acoustic intensity and propagation of the acoustic noise to the surface location.

The flight planning method also includes determining, using a noise-abatement function, a noise-abatement value of the proposed trajectory for the aerial vehicle based at least on the perceived noise at the surface location. The noise-abatement function can receive as input one or more estimates of perceived noise along the proposed trajectory, and output a noise-abatement value for the trajectory. The noise-abatement value can be a number having a range that is defined by weights of the noise-abatement function. A higher noise-abatement value may correspond to a low level of community noise. Whereas, a lower noise-abatement value may correspond to a high level of community noise. For example, the noise-abatement function may yield a noise-abatement value of five for a first proposed trajectory, and yield a noise-abatement value of ten for a second proposed trajectory. The fact that the noise-abatement value of the second proposed trajectory is greater than the noise-abatement value of the first proposed trajectory reflects the estimate that the second proposed trajectory is more likely to produce less perceived community noise than the first proposed trajectory. Hence, in some instances, proposed trajectories having high noise-abatement values may be preferable over proposed trajectories having low noise-abatement values.

As described more fully below, the noise-abatement value may also be a function of operation values of the aerial vehicle for the proposed trajectory, such as a time and fuel. For instance, the noise-abatement function can include a component that factors in an operational value of the aerial vehicle for the proposed trajectory, such that the noise-abatement value of a proposed trajectory is inversely proportional to the operational value. With this approach, as an operational value of a proposed trajectory increases, the noise-abatement value output by the noise-abatement function may decrease.

In addition, the flight planning method includes determining a flight plan for the aerial vehicle based on the noise-abatement value of the proposed trajectory, and outputting the flight plan for use in navigating the aerial vehicle. For example, a flight planning system can evaluate the proposed trajectory relative to an additional proposed trajectory, and can include the proposed trajectory in the flight plan based on the proposed trajectory having a greater noise-abatement value than a noise abatement-value corresponding to the additional proposed trajectory.

Conventional approaches to limiting community exposure to aerial vehicle noise often restrict flight times or flight locations. These approaches are inefficient, however, because the restrictions are based on static, worst-case estimates of an environment or the weather. For instance, these approaches may estimate noise propagation based on a worst-case assumption of the physical environment, and estimate the perceived noise based on a worst-case assumption for human behavior (e.g., a worst-case assumption for the population density at a surface location). As a result, the restrictions can be overly restrictive at certain times and/or locations, such as when the environment is not exhibiting worst-case conditions.

The flight planning methods described herein exploit temporal variations in the environment and/or weather (e.g., over the course of a day, from day-to-day, month-to-month, season-to-season), and dynamically choose flight plans that reduce noise to noise-sensitive communities. As such, compared to approaches that restrict hours at which aerial vehicles can operate, the flight planning methods facilitate operation of aerial vehicles at any time when noise constraints can be complied with as indicated by the determined noise-abatement value for a proposed trajectory. When compared to prior approaches that restrict routes and locations where aerial vehicles can operate, the present flight planning methods described herein facilitate operation of aerial vehicles through, or at, any location when noise constraints can be complied with as indicated by the determined noise-abatement value for a proposed trajectory.

Various other features of these systems and methods are described hereinafter with reference to the accompanying figures.

Referring now to FIG. 1, FIG. 1 illustrates a flight planning system 100, according to an example. As shown in FIG. 1, flight planning system 100 includes a flight plan processing system 102 and an output system 104.

Flight plan processing system 102 can include a processor and a non-transitory computer-readable medium storing program instructions that are executable by processor to carry out any of the flight plan processing functions described herein. Processor could be any type of processor, such as a microprocessor, digital signal processor, multicore processor, etc. Alternatively, flight plan processing system 102 could include a group of processors that are configured to execute the program instructions, or multiple groups of processors that are configured to execute respective program instructions.

Flight plan processing system 102 can take the form of a laptop computer, mobile computer, wearable computer, tablet computer, desktop computer, server, or other type of computing device. As such, flight plan processing system 102 can include a display, an input device, and one or more communication ports through which flight plan processing system 102 is configured to communicate with other devices or components of flight planning system 100, such as output system 104.

As further shown in FIG. 1, flight plan processing system 102 includes an analysis module 106 and a decision module 108. Analysis module 106 and decision module 108 can be implemented using a combination of hardware and software. For instance, analysis module 106 can be implemented using one or more processors that are configured to execute program instructions stored in a memory. Likewise, decision module 108 can be implemented using one or more processors that are configured to execute program instructions stored in a memory. Flight plan processing system 102 can utilize the analysis module 106 and the decision module 108 to determine a flight plan for an aerial vehicle 110, which can include an airplane, rotorcraft, or lighter than air vehicle that emits acoustic noise.

Analysis module 106 includes a combination of information and modeling systems that incorporate and analyze dynamic information about an environment to estimate perceived noise at a surface location. The surface location can be a defined area for which community noise is desired to be reduced, such as a city, town, neighborhood, park, etc. Analysis module 106 can include a geographical information system 112, a weather model system 114, an aerial vehicle model system 116, and an acoustic model system 118. As described below, each of the components of the analysis module 106 capture or analyze different data, thereby creating a robust and flexible solution for analyzing sound propagation based on dynamic information about an environment.

Geographical information system 112 can be implemented as a software system executing on flight plan processing system 102. Data contained within geographical information system 112 can include environmental features of an environment, such as terrain elevation data, albedo data, foliage data, population-density data, and masking-noise data, which the geographical information system can provide to the acoustic model system 118 or the weather model system 114.

Some of the environmental features can impact sound propagation. For instance, the albedo data can be indicative of the location and strength of urban thermal plumes. Albedo is a measure of the reflectivity of a surface. White objects have a high albedo. Whereas, dark objects have a low albedo. The albedo data can be derived from pixel intensities of satellite images of an environment. In sunny weather, a dark surface like an asphalt runway or a parking lot may become much hotter than the surrounding surface. As a result, the dark surface can produce a plume of rising hot air. In calm air, the plume becomes narrower with altitude as the warm air accelerates upward. This means the rising column of air is wider at its base, so there is a low, wide region in which sound moves quickly. The result is that a plume of rising hot air makes sound waves curve away from the dark, hot ground and back up to the sky, and to curve even more strongly than with the standard lapse rate.

The foliage data can be indicative of an amount of greenery or growth present in an environment. Foliage varies by season, therefore the foliage data may vary by season. In areas with high foliage, more sound may be absorbed. Whereas, in areas with low foliage, less sound may be absorbed.

The environmental features can also impact the level of perceived noise at a surface location. Perception of acoustic noise emitted by an aerial vehicle as irritating (or scary, for animals) is partly dependent on what other noises are present. Against silence, a faint acoustic noise may be irritating, but in the roar of a waterfall or of a busy highway, the same acoustic noise might not even be noticed. The masking-noise data can be indicative of a masking-noise level at a surface location. In some examples, the weather model system 114 can provide current wind or recent rainfall data to the acoustic model system 118, while the geographical information system 112 provides data about weather-dependent noise sources like trees or waterfalls to the acoustic model system 118. The acoustic model system 118 can then use the weather data and masking-noise data to estimate masking noises like wind through the trees or water over a waterfall.

In some examples, geographical information system 112 can provide temporal data about human-generated noise sources like highways, railroads, ship docks, and factories to the acoustic model system 118, which the acoustic model system 118 can use to estimate a degree to which acoustic noise emitted by an aerial vehicle is masked by these other sources at various times. Temporal data about sources like roads can be derived from traffic densities obtained from a mapping service by geographical information system 112.

The population density of an environment can impact the significance of the presence of acoustic noise at a surface location. In an area with a high population density, the presence of acoustic noise may be more relevant than areas with a low population density. Further, perception of acoustic noise as an irritant depends on what listeners are doing (e.g., whether they are indoors (i.e., shielded from noise) or outdoors (unshielded), and if indoors, whether their windows are open or closed). In some examples, population-density data may be weighted based on knowledge of whether a surface location more closely resembles an outdoor area (e.g., park, zoo, etc.), or an indoor area (e.g., office buildings, retail stores, etc.). For instance, given a population-density of 100 units for a surface location, the population-density may be reduced to 75 units if the surface location is known to correspond to an indoor area. Such classifications of surface locations can be maintained by geographical information system 112.

Additionally, geographical information system 112 can maintain data about temporal patterns in population-density. For example, some water recreation areas have more human visitors during the summer than during the winter; for ski areas, the opposite is true. School children are indoors during school hours but outdoors on playgrounds during recess periods. The children are elsewhere during the winter holiday, spring break, or summer vacation. Hence, the population-density data for a given surface location can vary over time.

A proposed trajectory of a flight plan can include an origin, a destination, and one or more waypoints between the origin and the destination. The environmental features relevant to a proposed trajectory can therefore include environmental features beneath and surrounding the origin, destination, and one or more waypoints, such as areas within a threshold distance of a projection of the trajectory onto the surface.

Weather model system 114 can also be implemented as a software system executing on flight plan processing system 102. Weather model system 114 can produce weather data, such as wind data, temperature data, or snowfall data. In addition, weather model system 114 can provide the weather data to acoustic model system 118 and the acoustic model system 118 can use the weather data to incorporate weather effects, such as wind shear or temperature gradients, into an acoustic prediction.

Aerial vehicle model system 116 can also be implemented as a software system executing on flight plan processing system 102. Aerial vehicle model system 116 can determine estimates of acoustic intensity of aerial vehicle 110 and provide the acoustic intensity to acoustic model system 118. Estimates of acoustic intensity may be a function of frequency, air speed, the direction of a surface location from aerial vehicle 110, and/or configuration of the aerial vehicle (e.g., which engine/motor the aerial vehicle is equipped with, an amount of weight carried by the aerial vehicle, etc.).

In some instances, predicted air speed may vary based on wind data. For instance, aerial vehicle 110 may fly at high thrust to make acceptable progress against a headwind or to maintain a safety margin against possible wind shear. Conversely, aerial vehicle 110 may fly at low or moderate thrust if there is not a headwind or risk of wind shear. Pilots are trained about approach speed based on variability of wind; when there is high risk of wind shear, pilots often maintain a higher speed. Hence, acoustic model system 118 can infer that air speed may be higher when there is wind shear at an aerial location. Accordingly, in some instances, weather model system 114 may provide wind data to aerial vehicle model system 116, for use in estimating air speed, from which acoustic intensity may be derived.

Aerial vehicle model system 116 can also provide an estimate of an operational value of aerial vehicle 110 for a proposed trajectory. For instance, aerial vehicle model system 116 can provide an estimate of fuel burn or flight time for a proposed trajectory. Fuel burn may dependent on wind data. For instance, aerial vehicle 110 may start at location A with full fuel tanks, and then fly an out-and-back mission from location A to location B, and then back to location A. The weight of aerial vehicle at location B may depend on the winds experienced by aerial vehicle 110 on the way to B. If the wind blows from location A toward location B, aerial vehicle may have more fuel and, thus, more weight than if the wind blows from location B toward location A. Accordingly, in some instances, weather model system 114 may provide wind data to aerial vehicle model system 116, for use in estimating fuel burn and weight. Aerial vehicle model system 116 can then estimate acoustic intensity of acoustic noise emitted by aerial vehicle 110 based on the weight.

Acoustic model system 118 can be implemented as a software system executing on flight plan processing system 102. Acoustic model system 118 can estimate perceived noise at one or more surface locations based on acoustic noise emitted by aerial vehicle 110 at one or more aerial locations.

The one or more aerial locations can be locations corresponding to the proposed trajectory. For instance, an aerial location can include the origin, the destination, or a midpoint between the origin and the destination. For a given aerial location, the surface location(s) can include a location that is directly below the aerial location. In addition, the surface location(s) can include surface locations on multiple sides of the location that is directly below the aerial location. As a particular example, for an aerial location that is a midpoint of a proposed trajectory, the surface locations can include a first surface location directly below the aerial location, a second surface location that is one-half mile north of the first surface location, a third surface location that is one-half mile east of the first surface location, a fourth surface location that is one-half mile south of the first surface location, and a fifth surface location that is one-half mile west of the first surface location.

One of ordinary skill in the art will appreciate that a proposed trajectory could also be segmented into more than two parts, yielding additional aerial locations for analysis. For instance, a proposed trajectory can be segmented into four parts, yielding three different aerial locations that connect the four segments (i.e., a first aerial location between a first segment and a second segment, a second aerial location between the second segment and a third segment, and a third aerial location between the third segment and a fourth segment).

Acoustic model system 118 does not only rely on static information, like terrain or a fixed temperature lapse rate, to estimate how loud a sound transmitted from location X is when received at location Y. Rather, acoustic model system 118 also incorporates dynamic information such as weather data, foliage data, masking-noise data, and population-density data to estimate how noticeable a sound transmitted from location X is when heard at location Y.

By way of example, acoustic model system 118 can receive terrain elevation data, and estimate propagation of acoustic noise emitted by aerial vehicle from an aerial location to a surface location based on the terrain elevation data. For instance, when estimating propagation from an aerial location X to a surface location Y, acoustic model system 118 can obtain terrain elevation data for points between aerial location X and surface location Y, and determine how acoustic noise emitted at aerial location X will intersect and/or interact with terrain as the acoustic noise propagates toward surface location Y.

In addition, acoustic model system 118 can receive albedo data that is indicative of a thermal plume, and estimate propagation of the acoustic noise from the aerial location to the surface location based on the albedo data. For instance, For instance, when estimating propagation from an aerial location X to a surface location Y, acoustic model system 118 can obtain albedo indicative of a thermal plume between aerial location X and surface location Y, and determine how acoustic noise emitted at aerial location X will intersect with the thermal plume as the acoustic noise propagates toward surface location Y.

Additionally or alternatively, acoustic model system 118 can receive foliage data, and estimate propagation of the acoustic noise from the aerial location to the surface location based on the foliage data. Still further, acoustic model system 118 can additionally or alternatively receive weather data, and estimate propagation of the acoustic noise from the aerial location to the surface location based on the weather data.

Acoustic model system 118 can also receive masking-noise data that is indicative of a masking-noise level at the surface location, and estimate the perceived noise at the surface location based on the masking-noise level. For instance, the acoustic model system 118 can subtract the masking-noise level from an estimated level of received noise at surface location.

After obtaining an estimate of perceived noise at a surface location, analysis module 106 can use a noise-abatement function to determine a noise-abatement value for a proposed trajectory. In one example, the noise-abatement function can multiply the perceived noise by a population density of the surface location. Additionally or alternatively, the noise-abatement function can multiply the perceived noise by a first weight, multiply an operational value for the proposed trajectory by a second weight, and sum the two products to yield the noise-abatement value. The second weight can be negative, such that a higher operational value yields a lower noise-abatement value.

In some instances, given a proposed trajectory, acoustic model system 118 can estimate perceived noise at multiple surface locations based on acoustic noise emitted by aerial vehicle 110 at multiple points of the proposed trajectory. For instance, acoustic model system 118 can estimate a first amount of perceived noise at a first surface location due to acoustic noise emitted by aerial vehicle 110 at a first aerial location, and estimate a second amount of perceived noise at a second surface location due to acoustic noise emitted by aerial vehicle 110 at a second aerial location. The first surface location could be directly below the first aerial location, and the second surface location could be directly below the second aerial location, for instance. The noise-abatement function can then sum together the first perceived noise and the second perceived noise. In line with the discussion above, the noise-abatement function could also factor in population density and/or operation value(s).

Similarly, one of ordinary skill in the art will appreciate that, for the proposed trajectory, the acoustic model system 118 can estimate perceived noises at multiple different surface locations due to acoustic noise emitted by aerial vehicle 110 at the first aerial location, and estimate perceived noises at multiple different surface locations due to acoustic noise emitted by aerial vehicle 110 at the second aerial location. Further, the noise-abatement function can similarly sum together each of these estimates of perceived noise.

In some instances, analysis module 106 can determine noise-abatement values for different respective proposed trajectories. For instance, there may be multiple proposed trajectories between an origin point A and a destination point B. The acoustic model system 118 can determine a first noise-abatement value for a first proposed trajectory, and determine a second noise-abatement value for a second proposed trajectory.

Decision module 108 can determine a flight plan for aerial vehicle 110 based on the noise-abatement value(s) determined by analysis module 106. As one example, analysis module 106 can determine a first noise-abatement value for a first proposed trajectory and a second noise-abatement value for a second proposed trajectory. Decision module 108 can then select the first proposed trajectory for inclusion in a flight plan based on the first noise-abatement value being greater than the second noise-abatement value. As a result, the selected flight plan can include the trajectory that is anticipated to cause less community noise.

Additionally or alternatively, decision module 108 can apply an optimization process to a proposed trajectory, in an effort to improve the noise-abatement value. For instance, after analysis module 106 outputs a noise-abatement value for a proposed trajectory of a flight plan, decision module 108 can apply a variation to the proposed trajectory to generate a modified trajectory, and instruct analysis module 106 to determine a noise-abatement value for the modified trajectory. Further, based on the effect of the variation on the noise-abatement value, decision module 108 can apply a further variation to the proposed trajectory to generate a second modified trajectory, and instruct analysis module 106 to determine a noise-abatement value for the second modified trajectory. This process can be repeated, until a proposed trajectory having the maximum noise-abatement value is found. One of ordinary skill in the art will appreciate that this optimization process could take various forms, such as a gradient descent process, for instance.

After selecting a proposed trajectory, decision module 108 can provide a flight plan including the proposed trajectory to output system 104. In addition to the proposed trajectory, the flight plan can include additional information such as a launch time, a landing time, and/or the noise-abatement value.

Output system 104 can output printed or electronic information in the form of text, data, images, or combinations thereof. Output system 104 can include a communication interface 120 configured to transmit the flight plan to aerial vehicle 110. Communication interface 120 can include a wired or wireless communication interface. For instance, communication interface 120 can include a radio link to a flight control computer of aerial vehicle 110. Alternatively, output system 104 can include a printer that is configured to output a flight plan for a pilot, or any other system for: (i) transforming the flight plan into a form that can be used to fly the proposed trajectory and (ii) providing the form for use by the aerial vehicle 110.

As noted above, static models or regulations used in conventional approaches for reducing community noise due to aerial vehicles omit several dynamic factors that affect sound propagation. These dynamic factors include temperature gradients, wind shear, attenuation by foliage or snow, masking by other noises, changes in the aerial vehicle, and time-varying human activities, for instance. FIGS. 2 through 5 describe some of these dynamic factors and various techniques that the systems and methods described herein use to incorporate these dynamic factors into flight planning.

Figure 2:
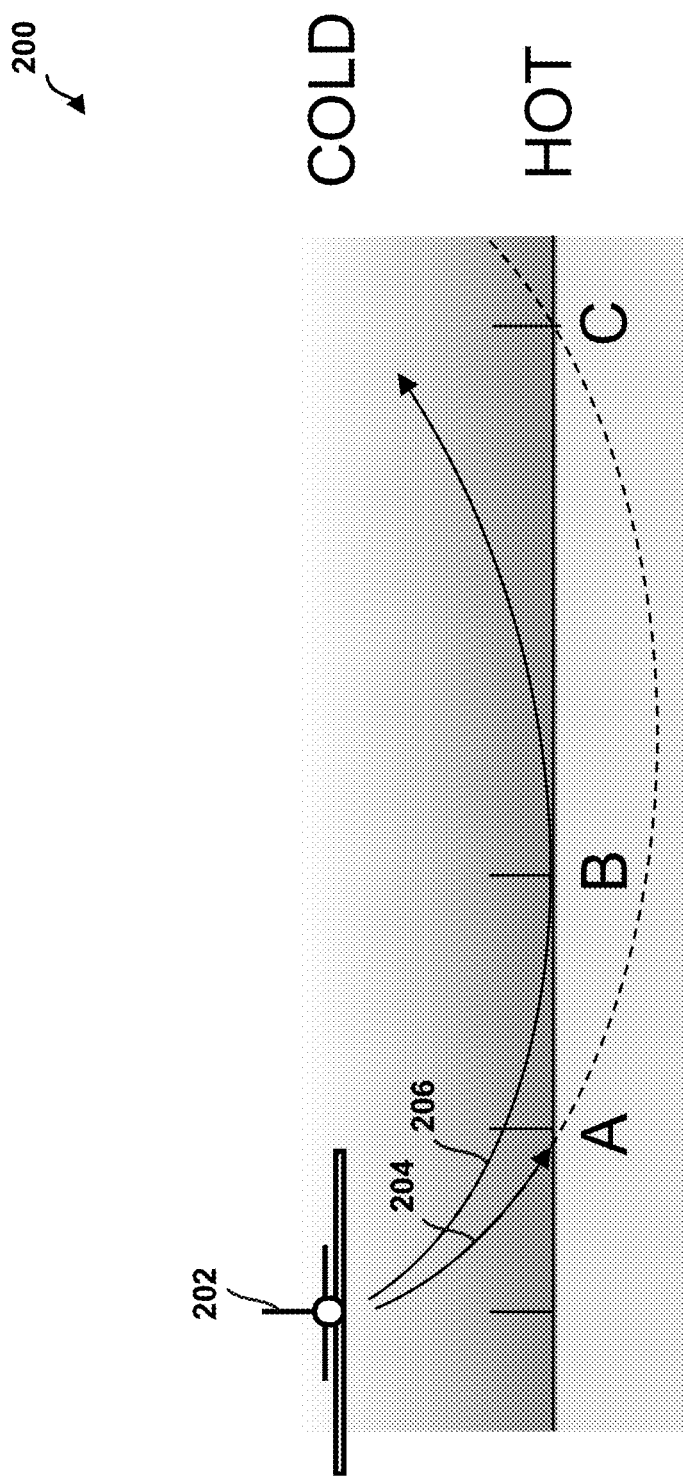
FIGS. 2 and 3 are conceptual illustrations of acoustic noise traveling through temperature gradients, according to examples.
Figure 3:
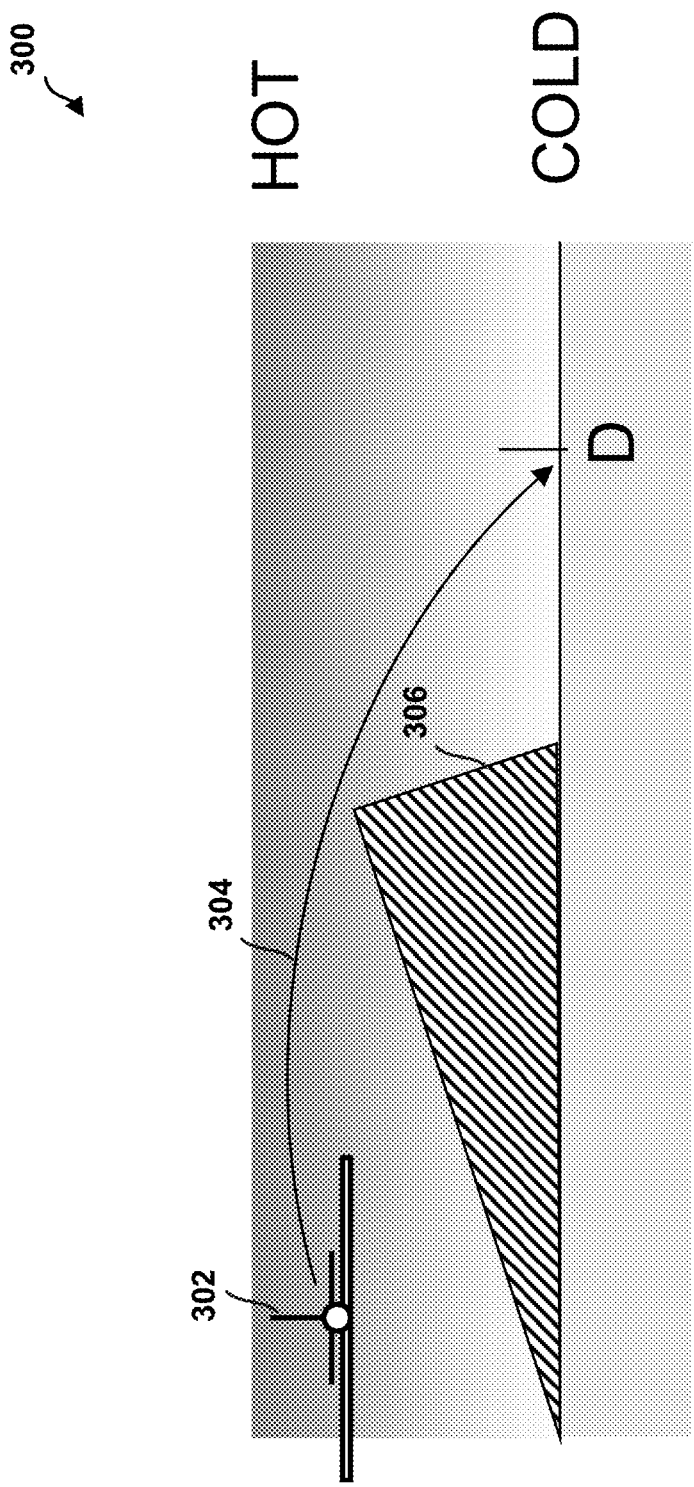

FIGS. 2 and 3 are conceptual illustrations 200, 300 of acoustic noise traveling through temperature gradients, according to examples. The speed of sound in air is proportional to the square root of absolute temperature. Therefore, waves of sound follow a curved path when a temperature gradient is present. An analogy is optics, where the path of light refracts toward regions where the local speed of light is slow, i.e., toward materials with a high index of refraction. Cold air acts as if it has a higher "index of refraction" for sound than warm air. In other words, the sound path curves from the warmer region to the colder region. This effect is shown in conceptual illustration 200 of FIG. 2.

In conventional approaches, this effect is sometimes exploited in a static way to regulate flight zones for aerial vehicles. As shown in conceptual illustration 200 of FIG. 2, in daytime, air temperature typically changes with altitude at the lapse rate of about −2° C. per thousand feet. Thus, acoustic noise emitted by aerial vehicle 202 curves away from the ground. Beyond some distance, acoustic noise that initially traveled at an angle slightly below horizontal along a sound path 204 will be blocked by the ground at surface location A. Whereas, for acoustic noise that travels along a sound path 206, the acoustic noise will travel at an upward angle beyond surface location B. In a static approach, the distance between a surface location AV directly below aerial vehicle 202 and surface location B is sometimes used to set the boundaries of acceptable flight routes. This is a static, worst-case assumption that does not take into consideration dynamic temperature data.

As shown in conceptual illustration 300 of FIG. 3, at night under clear skies, the ground cools by radiation; air near the ground becomes colder and the lapse rate becomes positive. When this happens, acoustic noise emitted from an aerial vehicle 302 can curve toward the ground along a sound path 304. People on the ground can hear the noise farther away than they would during daytime or under cloudy night skies, even beyond an obstacle like a hill 306. This result (plus the human preference for nighttime sleep) often leads to restrictions on nighttime flight.

In actuality, daytime lapse rates vary depending on insolation (i.e., solar energy flux) which varies by season, time of day, and cloud cover, and based on humidity. Similarly, nighttime lapse rates vary depending on cloud cover and humidity. With the systems and methods disclosed herein, acoustic model system 118 of FIG. 1 can more accurately estimate sound paths over which acoustic noise will propagate at different times of the day using knowledge of temperature gradients. For instance, weather model system 114 of FIG. 1 can provide three-dimensional temperature data (i.e., latitude, longitude, and altitude) to acoustic model system 118, and acoustic model system 118 can predict, based on the temperature gradients indicated within the 3D temperature data, sound paths from various aerial locations to various surface location at specific times. By using dynamic temperature data rather than static estimates of temperature gradients, accurate estimates of propagation of acoustic noise can be obtained, thereby allowing for strategically chosen flight plans that reduce community noise.

In some examples, the acoustic model system 118 may also exploit small-scale temperature variations that are not usually part of weather forecasts. In line with the discussion above, weather model system 114 may obtain albedo data and predict the location and strength of thermal plumes. Such thermal plumes of rising hot air can make sound waves curve away from a dark, hot ground location and back up to the sky, and to curve even more strongly than with the standard lapse rate. With knowledge of small-scale temperature variations, acoustic model system 118 can account for thermal plumes when estimating propagation of acoustic noise. As a result, when thermal plumes are predicted, the flight plan processing system 102 of FIG. 1 may output a trajectory that allows an aerial vehicle to operate closer to a community, since the thermal plume is expected to cause the community to perceive less acoustic noise than an amount of acoustic noise that the community would perceive in standard weather.

Figure 4:
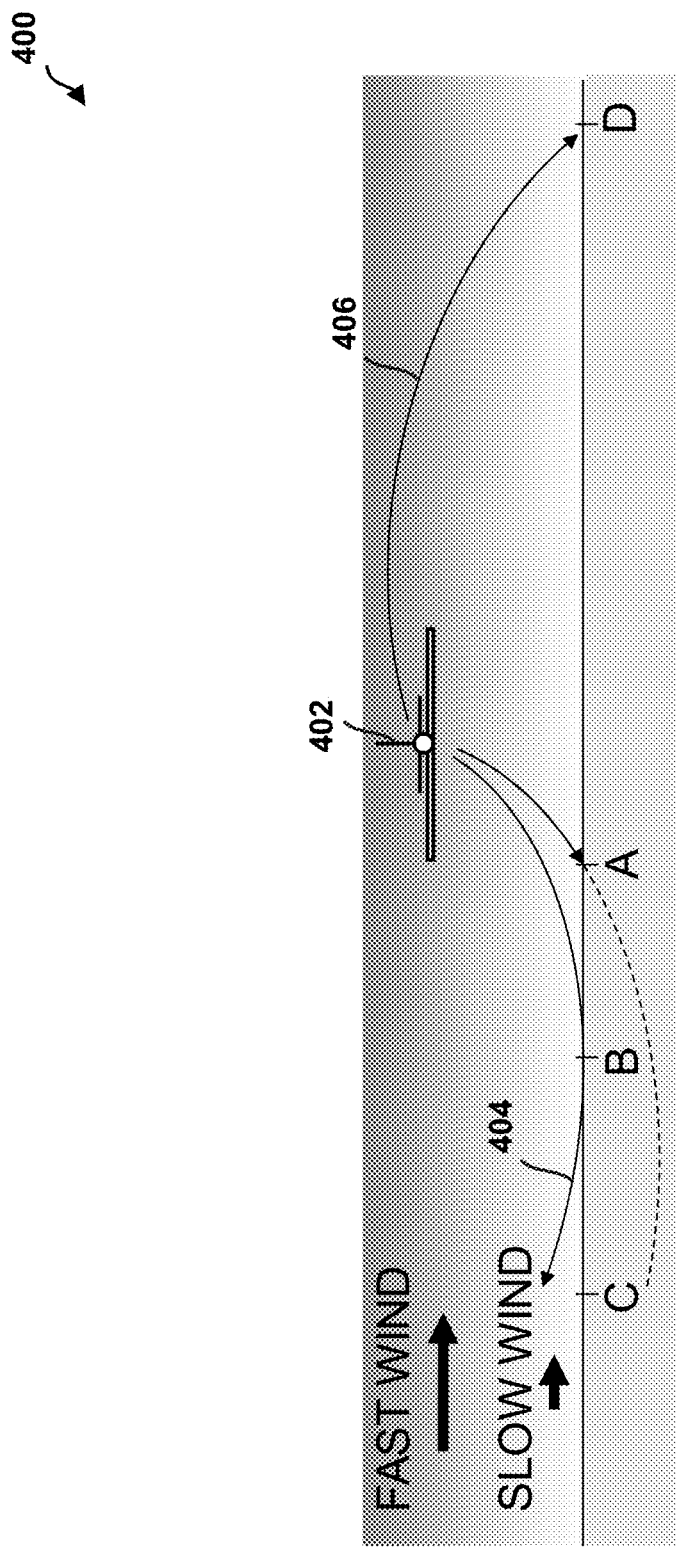
FIG. 4 is a conceptual illustration of acoustic noise traveling through wind shear, according to an example.

FIG. 4 is a conceptual illustration of acoustic noise traveling through wind shear, according to an example. The path of sound is curved by wind shear. Wind shear can be caused by variations in winds at different altitudes. As shown in FIG. 4, in the presence of wind shear, acoustic noise emitted by aerial vehicle 402 upwind along sound path 404 curves upward beyond surface location B. Sound path 404 curves upward because the upper part of each sound wave moves slower (in inertial coordinates) than the part closer to the ground. Whereas, sound traveling downwind along sound path 406 curves downward. As a result, people on the ground beyond surface location D are not expected to hear the acoustic noise emitted by aerial vehicle 402.

With the systems and methods disclosed herein, acoustic model system 118 of FIG. 1 can accurately estimate sound paths over which acoustic noise will propagate at different times of the day using knowledge of wind shear. For instance, geographical information system 112 of FIG. 1 can estimate drag coefficients from terrain elevation data and foliage data. Geographical information system 112 can then provide the drag coefficients to weather model system 114. Weather model system 114, in turn, can use the drag coefficients, together with measured or forecast wind vectors, to estimate magnitude and direction of wind shear in various locations. Weather model system 114 can then provide the estimates regarding wind shear to acoustic model system 118, for use in estimating propagation of acoustic noise from various aerial locations. By using data regarding wind shear, accurate estimates of propagation of acoustic noise can be obtained, thereby allowing for strategically chosen flight plans that reduce community noise.

Sound is also absorbed by the vibrational and rotational degrees of freedom in air molecules, with higher frequencies being more strongly absorbed. Sound traveling against the wind must travel through more air to reach a given geometric distance and therefore must incur more absorption. Sound traveling downwind travels through less air to reach a given geometric distance and therefore incurs less absorption. Acoustic model system 118 can estimate propagation while accounting for these effects. For example, acoustic model system 118 can use this data to adjust the predicted intensity or spectrum of sound at various locations.

Figure 5:
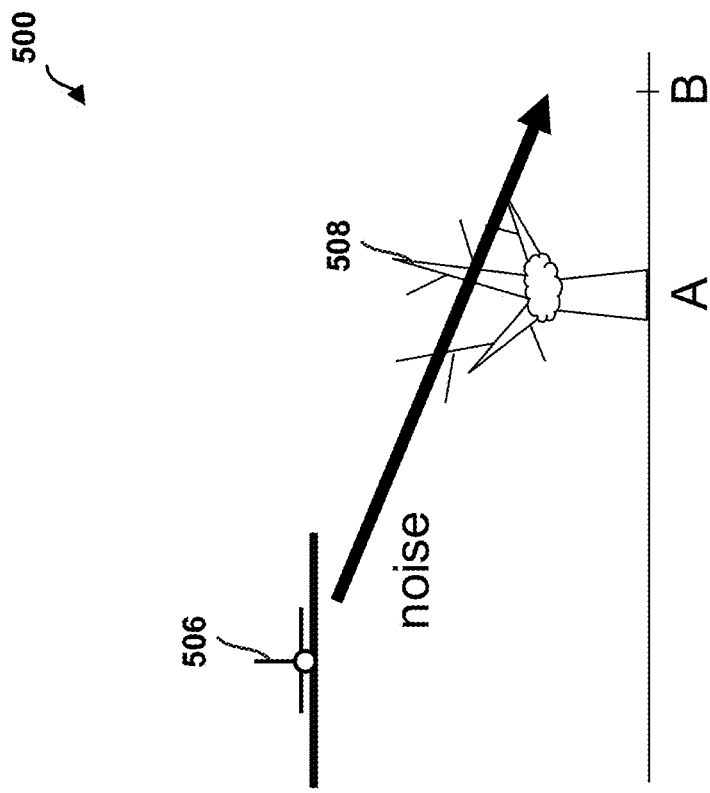
FIG. 5 is a conceptual illustration showing acoustic noise absorbed by foliage, according to an example.
Figure 5:
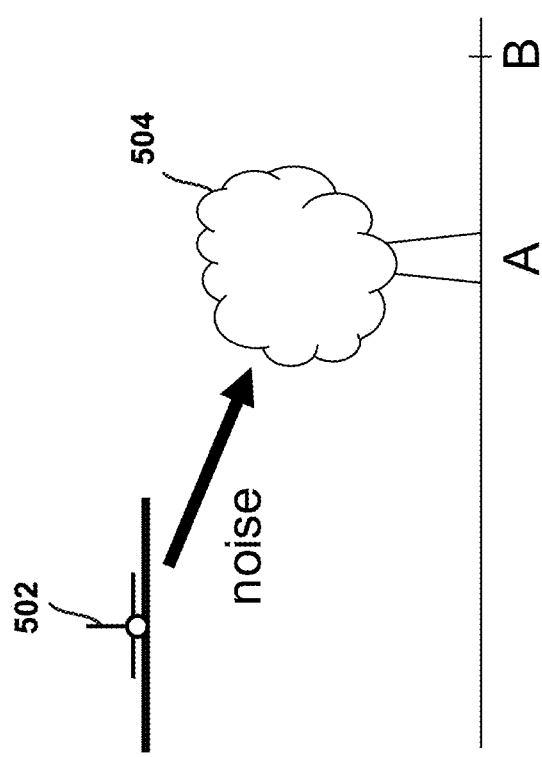

FIG. 5 is a conceptual illustration 500 showing acoustic noise absorbed by foliage, according to an example. Sound can be absorbed by foliage. However, foliage varies by season. For instance, during the summer, acoustic noise emitted by an aerial vehicle 502 can be absorbed by leaves of a tree 504. Whereas, during the winter, acoustic noise emitted by an aerial vehicle 506 can pass through sparse branches of a tree 508.

With the systems and methods disclosed herein, acoustic model system 118 of FIG. 1 can more accurately estimate sound paths over which acoustic noise will propagate at different times of the year using foliage data. For instance, geographical information system 112 of FIG. 1 can maintain foliage data that geographical information system 112 can provide to acoustic model system 118. Acoustic model system 118 can then use the foliage data for estimating propagation of acoustic noise from various aerial locations. By using foliage data, accurate estimates of propagation of acoustic noise can be obtained, thereby allowing for strategically chosen flight plans that reduce community noise. Such flight plans may vary throughout the year due to the varying nature of foliage.

Similarly, sound can be absorbed by snowfall, and snowfall rates vary by season. With the systems and methods disclosed herein, acoustic model system 118 of FIG. 1 can more accurately estimate sound paths over which acoustic noise will propagate at different times of the year using snowfall data. For instance, weather model system 114 of FIG. 1 can provide real-time or forecast snowfall rates to acoustic model system 118. Acoustic model system 118 can then use the snowfall rates for estimating propagation of acoustic noise from various aerial locations. By using snowfall data, accurate estimates of propagation of acoustic noise can be obtained, thereby allowing for strategically chosen flight plans that reduce community noise.

Figure 6:
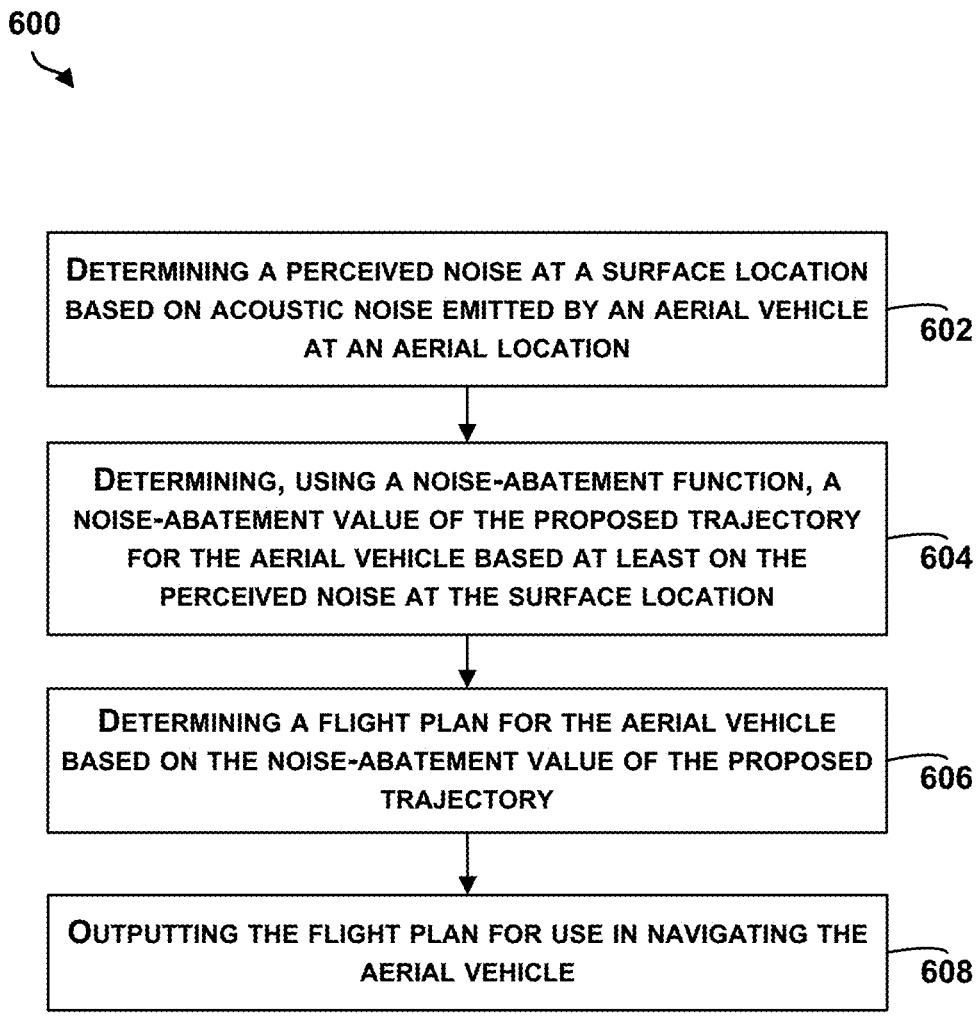
FIG. 6 shows a flowchart of a method, according to an example.

FIG. 6 shows a flowchart of a method 600, according to an example. Method 600 shown in FIG. 6 presents an embodiment of a method that, for example, could be used with the flight planning system 100 shown in FIG. 1, for example, or any of the systems disclosed herein. Any of the example devices or systems described herein, such as components of flight planning system 100 of FIG. 1, may be used or configured to perform logical functions presented in FIG. 6.

Method 600 can include one or more operations, functions, or actions as illustrated by one or more of blocks 602-608. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

Initially, at block 602, the method 600 includes determining a perceived noise at a surface location based on acoustic noise emitted by an aerial vehicle at an aerial location. The aerial location can correspond to a waypoint along a proposed trajectory. In addition, determining the perceived noise can include estimating propagation of the acoustic noise from the aerial location to the surface location based on environmental features of the environment or weather data for the environment. For instance, block 602 can include estimating propagation of the acoustic noise based on terrain elevation data, albedo data, foliage data, wind data, temperature data, and/or snowfall data.

At block 604, the method 600 includes determining, using a noise-abatement function, a noise-abatement value of the proposed trajectory for the aerial vehicle based at least on the perceived noise at the surface location. In some instances, the noise-abatement function may sum together estimates of perceived noise for multiple surface locations. The multiple surface locations can correspond to one or more aerial locations along the proposed trajectory. In addition, the noise-abatement function can include one or more additional components, such as a component that factors in an operational value of the aerial vehicle for the proposed trajectory, a component that factors in a population density at the surface location(s), and a component that factors in a masking-noise level at the surface location(s).

At block 606, the method 600 includes determining a flight plan for the aerial vehicle based on the noise-abatement value of the proposed trajectory. For instance, block 606 can include applying an optimization process to the proposed trajectory, in an effort to improve the noise-abatement value. If a modified version of the proposed trajectory yields a greater noise-abatement value, then the modified version of the proposed trajectory can be specified in the flight plan.

At block 608, the method 600 includes outputting the flight plan for use in navigating the aerial vehicle. For instance, a communication interface of an output system, such as output system 104 of FIG. 1, can transmit the flight plan to the aerial vehicle.

Figure 7:
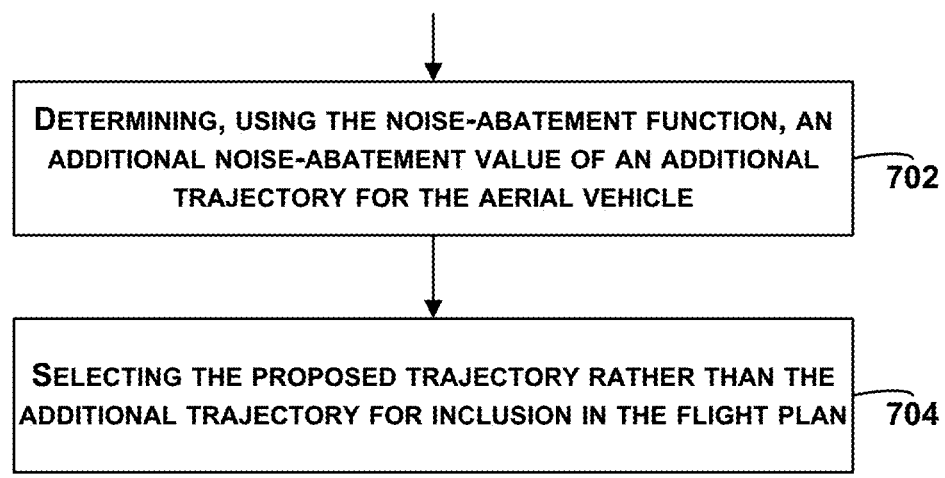
FIG. 7 shows additional operations for use with the method shown in FIG. 6.

FIG. 7 shows additional operations for use with the method 600 shown in FIG. 6. Block 702 of FIG. 7 could be performed prior to block 606 of FIG. 6. For instance, block 702 of FIG. 7 could be performed in parallel with blocks 602 and 604 of FIG. 6, before blocks 602 and 604 of FIG. 6, or after blocks 602 and 604 of FIG. 6. Further, block 704 of FIG. 7 could be performed as part of block 606 of FIG. 6.

Figure 8:
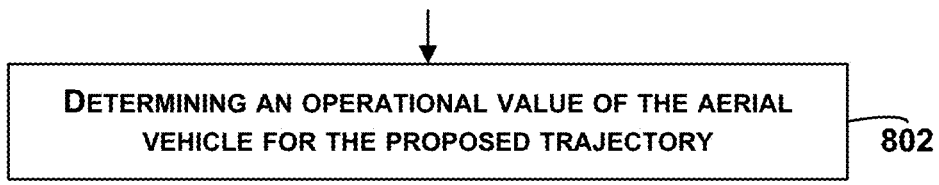
FIG. 8 shows an additional operation for use with the method shown in FIG. 6.

At block 702, FIG. 7 includes determining, using the noise-abatement function, an additional noise-abatement value of an additional trajectory for the aerial vehicle. Further, at block 704, FIG. 7 includes selecting a proposed trajectory rather than the additional trajectory for inclusion in the flight plan. For instance, block 704 can include selecting the proposed trajectory based on the noise-abatement value being greater than the additional noise-abatement value. In this manner, the trajectory that is more likely to reduce community noise (e.g., the proposed trajectory), as predicted by the noise-abatement values, can be included in the flight plan. After selecting the proposed trajectory, the flight plan can be used for flying the air vehicle according to the proposed trajectory, thereby reducing community noise due to the aerial vehicle for a defined area FIG. 8 shows an additional operation for use with the method 600 shown in FIG. 6. Block 802 of FIG. 8 could be performed prior to block 604 of FIG. 6. For instance, block 802 of FIG. 8 could be performed in parallel with block 602 of FIG. 6, before block 602 of FIG. 6, or after block 602 of FIG. 6.

At block 802, FIG. 8 includes determining an operational value of the aerial vehicle for the proposed trajectory. The operational value can include a fuel burn or a flight time, for instance. Further, the determining of the noise-abatement value at block 604 of FIG. 6 can then be further based on the operational value.

The systems and methods described herein can be integrated into a variety of useful systems. As one example, the flight planning system 100 of FIG. 1 can be implemented by an operator as a service that provides route guidance for clients. Given a client request for a route from location A to location B, the service can provide a route that minimizes community noise while also satisfying other factors, such as efficiency, access to safe landing sites, continuity of communication. As a particular example, the flight planning system 100 of FIG. 1 can be implemented in a control system for an aerial vehicle that adds constraints to the process of choosing a flight path in the event of an in-flight contingency, such as engine out or an encounter with jamming, which forces a diversion or an unplanned landing. The constraints can include (1) ensuring communications are available when needed during contingency operations; and (2) ensuring signals from a global positioning system (or other navigation system) are available when needed. The control system can be a control system for an unmanned aerial vehicle, such as the control system described in U.S. Pat. No. 8,798,922.

Alternatively, the flight planning system 100 of FIG. 1 can be used to allow a community to compute and impose dynamic fees that reflect current conditions and actual flight paths. Unlike today's operations, where a community unhappily tolerates acoustic noise emitted by aerial vehicles, imposes flat fees, or imposes restrictions on aerial vehicle operations, a community could use the flight planning system 100 of FIG. 1 to calculate noise-abatement values for flight plans, and charge fees that are inversely proportional to the noise-abatement values. With this approach, operators that operate flight plans having low noise-abatement values could be charged more than operators that operate flight plans having higher noise-abatement values, so as to deter operators from operating flight plans that are expected to cause excessive community noise. Billing a flight operator based on actual noise-abatement values incentivizes the flight operator do not simply stay below an acoustic threshold at all times, but to balance the goal of minimizing community noise when noise does the most harm (e.g., lots of people exposed and/or little masking noise) with the goal of operating efficiently when the associated noise does minimal harm. Further, with this approach, the community gains lower overall noise, and the community receives compensation for occasional noisy flights. Meanwhile, operators also gain flexibility to balance their business needs with the community's needs.

As another example, the flight planning system 100 can be integrated into a real-time system that notifies a pilot or operator in near real-time of whether a change in trajectory will produce irritating noise. Anytime a pilot or operator deviates from a pre-determined trajectory, a new noise-abatement value for the modified trajectory can be determined and output to the pilot or operator.

An example method for flying an aerial vehicle can include obtaining an initial location of an aerial vehicle and a target location for the aerial vehicle. The initial location can be a starting ground location or a current aerial location. The method can also include determining a proposed trajectory between the initial location and the target location. Further, the method can include determining a perceived noise at a surface location based on acoustic noise emitted by the aerial vehicle at an aerial location along the proposed trajectory. Still further, the method can include determining a noise-abatement value of the proposed trajectory using a noise-abatement function.

In addition, the method can include determining that the noise-abatement value is less than a threshold, and based on the determination, causing the aerial vehicle to fly along a modified version of the proposed trajectory that has a greater noise-abatement value than the noise-abatement value of the proposed trajectory. The method can also include determining the modified version of the proposed trajectory, determining that the modified version has a noise-abatement value that exceeds the threshold, and causing the aerial vehicle to fly along the modified version based on the determination that the noise-abatement value for the modified version exceeds the threshold.

As still another example, the flight planning system 100 can be used for event planning. Given a known possible aerial location for an aerial vehicle and a proposed surface location for an event, the flight planning system 100 can estimate an amount of perceived noise at the proposed surface location during a particular season with particular weather. For example, a wedding in Seattle, Wash. on the weekend of a festival might face the possibility of jet noise from high speed aircrafts, given plausible weather scenarios. The flight planning system 100 could help a planner assess the odds that the bride and groom at an outdoor wedding would need to shout their vows to be heard over acoustic noise emitted by a jet.

As still another example, an airport authority for a town can recommend that aerial vehicles fly in particular patterns when leaving or entering the airport (e.g., left-hand patterns versus right-hand patterns) or suggest different departure directions based on current weather data or environmental features for the airport.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A method for flying an aerial vehicle, the method comprising:
    obtaining an initial location of the aerial vehicle;
    obtaining a target location for the aerial vehicle;
    determining, by a control system, a proposed trajectory for the aerial vehicle using the initial location and the target location;
    determining, by the control system, a perceived noise at a surface location based on acoustic noise emitted by the aerial vehicle at an aerial location along the proposed trajectory;
    determining, by the control system, a noise-abatement value of the proposed trajectory based at least on the perceived noise at the surface location and a flight time;
    determining, by the control system, that the noise-abatement value satisfies a threshold condition; and
    based on the determining that the noise-abatement value satisfies a threshold condition, causing the aerial vehicle to fly along the proposed trajectory.

2. The method of claim 1, wherein the noise-abatement value is inversely proportional to the flight time.

3. The method of claim 1, wherein the initial location is a current aerial location of the aerial vehicle.

4. The method of claim 1, further comprising predicting a location and strength of a thermal plume using albedo data, wherein determining the perceived noise comprises estimating propagation of the acoustic noise from the aerial location along the proposed trajectory to the surface location based on the location and strength of the thermal plume.

5. The method of claim 1, wherein determining the perceived noise comprises estimating propagation of the acoustic noise from the aerial location along the proposed trajectory to the surface location based on foliage data.

6. The method of claim 1, wherein determining the perceived noise comprises estimating propagation of the acoustic noise from the aerial location along the proposed trajectory to the surface location based on weather data.

7. The method of claim 1, wherein the perceived noise at the surface-location is further based on a masking-noise level at the surface location.

8. The method of claim 1, wherein the noise-abatement value is further based on a population density at the surface location.

9. A system for flying an aerial vehicle, the system configured to perform a set of acts comprising:
    obtaining an initial location of the aerial vehicle;
    obtaining a target location for the aerial vehicle;
    determining a proposed trajectory for the aerial vehicle using the initial location and the target location;
    determining a perceived noise at a surface location based on acoustic noise emitted by the aerial vehicle at an aerial location along the proposed trajectory;
    determining a noise-abatement value of the proposed trajectory based at least on the perceived noise at the surface location and a flight time;
    determining that the noise-abatement value satisfies a threshold condition; and
    based on the determining that the noise-abatement value satisfies a threshold condition, causing the aerial vehicle to fly along the proposed trajectory.

10. The system of claim 9, wherein the noise-abatement value is inversely proportional to the flight time.

11. The system of claim 9, wherein the initial location is a current aerial location of the aerial vehicle.

12. The system of claim 9, wherein:
the set of acts further comprises predicting a location and strength of a thermal plume using albedo data, and
determining the perceived noise comprises estimating propagation of the acoustic noise from the aerial location along the proposed trajectory to the surface location based on the location and strength of the thermal plume.

13. The system of claim 9, wherein determining the perceived noise comprises estimating propagation of the acoustic noise from the aerial location along the proposed trajectory to the surface location based on foliage data.

14. The system of claim 9, wherein determining the perceived noise comprises estimating propagation of the acoustic noise from the aerial location along the proposed trajectory to the surface location based on weather data.

15. The system of claim 9, wherein the perceived noise at the surface-location is further based on a masking-noise level at the surface location.

16. The system of claim 9, wherein the noise-abatement value is further based on a population density at the surface location.

17. A non-transitory computer-readable medium having stored therein instructions that are executable to cause a system to perform a set of acts comprising:

obtaining an initial location of an aerial vehicle;
obtaining a target location for the aerial vehicle;
determining a proposed trajectory for the aerial vehicle using the initial location and the target location;
determining a perceived noise at a surface location based on acoustic noise emitted by the aerial vehicle at an aerial location along the proposed trajectory;
determining a noise-abatement value of the proposed trajectory based at least on the perceived noise at the surface location and a flight time;
determining that the noise-abatement value satisfies a threshold condition; and
based on the determining that the noise-abatement value satisfies a threshold condition, causing the aerial vehicle to fly along the proposed trajectory.

18. The non-transitory computer-readable medium of claim 17, wherein the noise-abatement value is inversely proportional to the flight time.

19. The non-transitory computer-readable medium of claim 17, wherein the initial location is a current aerial location of the aerial vehicle.

20. The non-transitory computer-readable medium of claim 17, wherein the perceived noise at the surface-location is further based on a masking-noise level at the surface location.

* * * * *